M. HELM.
ELECTRICAL COIL AND METHOD OF WINDING SAME.
APPLICATION FILED JAN. 4, 1913.

1,080,830.

Patented Dec. 9, 1913.
3 SHEETS—SHEET 1.

WITNESSES
G. Sheehy
H. M. Spangler

INVENTOR
M. Helm
BY
Foster Freeman Watson & Coit
ATTORNEYS

M. HELM.
ELECTRICAL COIL AND METHOD OF WINDING SAME.
APPLICATION FILED JAN. 4, 1913.

1,080,830.

Patented Dec. 9, 1913.
3 SHEETS—SHEET 3.

WITNESSES.
G. Sheehy
H. M. Spangler.

INVENTOR
M. Helm
BY
Foster Freeman Watson & Coit
ATTORNEYS.

UNITED STATES PATENT OFFICE.

MAX HELM, OF PANKOW, NEAR BERLIN, GERMANY, ASSIGNOR TO JOSEPH ROBERT LEESON, OF BOSTON, MASSACHUSETTS.

ELECTRICAL COIL AND METHOD OF WINDING SAME.

1,080,830.

Specification of Letters Patent. Patented Dec. 9, 1913.

Application filed January 4, 1913. Serial No. 740,266.

*To all whom it may concern:*

Be it known that I, MAX HELM, a subject of the Emperor of Germany, residing at Pankow, near Berlin, Germany, have invented certain new and useful Improvements in Electrical Coils and Methods of Winding Same, of which the following is a specification.

My invention relates to coils for electrical purposes, such as magnet and resistance coils, and to the improved method for producing the same.

It consists essentially of a novel method for winding alternate layers of wire and insulating material simultaneously on the coil, with the wire laid in close coils in the well known manner of spool winding while the insulating strands or threads are laid with a diagonal or cross-wind similar to the system known as the "Universal" or "V-wind".

To effect this system of building up the coils I make use of two or more winding guides arranged to be reciprocated in respect to the winding-spindle or mandrel, and both operated simultaneously, the guide for the insulating material having a quick traverse while the guide for the wire is given a relatively slow traverse. In this way the coils of wire are laid side by side in close juxtaposition while the strands of insulating material are wound diagonally or cross-wise thereof and woven in and out among the coils of wire. The insulating strands, which may be of cotton yarn or other textile fiber, flat tape or any suitable attenuated material, form a mechanical binder for the wire coils, effectually linking them together and retaining them in their proper position, while also aiding in insulating the coils one from another and providing insulation between the layers. Through this system I am enabled to build up a coil without the use of spool heads or other retaining means, and when completed my new coil is much more staunch and stable than the usual form, and possesses increased electrical efficiency due to the precise arrangement of the windings, their protection against displacement, and the improved insulation therein.

The invention is fully described in the following specification, illustrated by the accompanying drawings, in which:—

Figure 1:
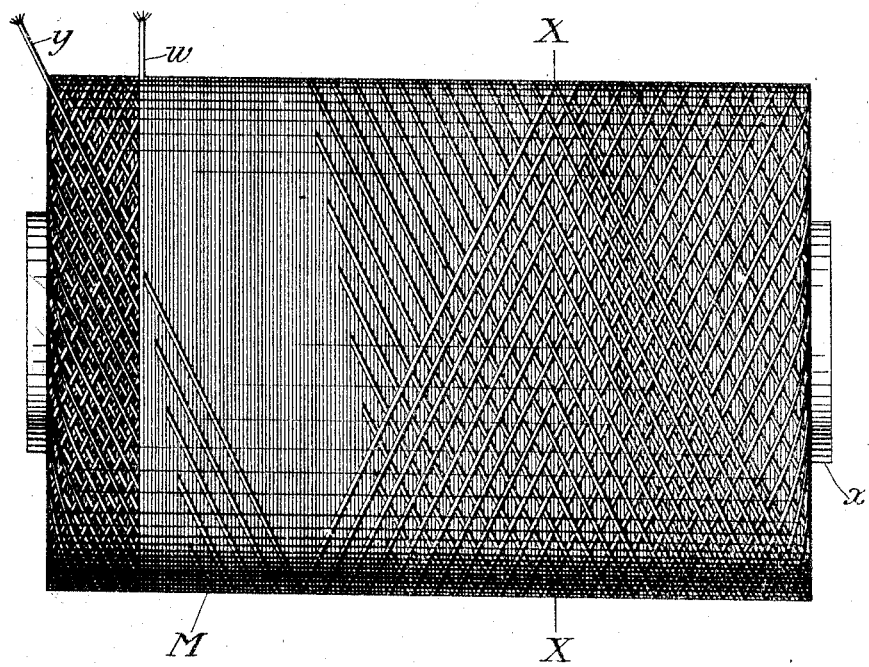
Figure 2:
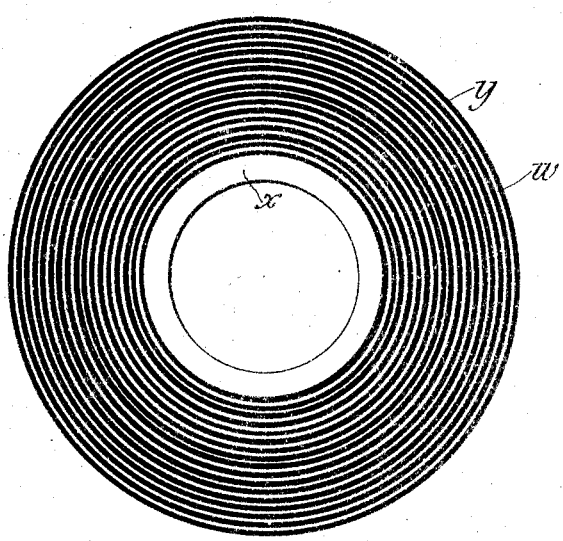
Figure 3:
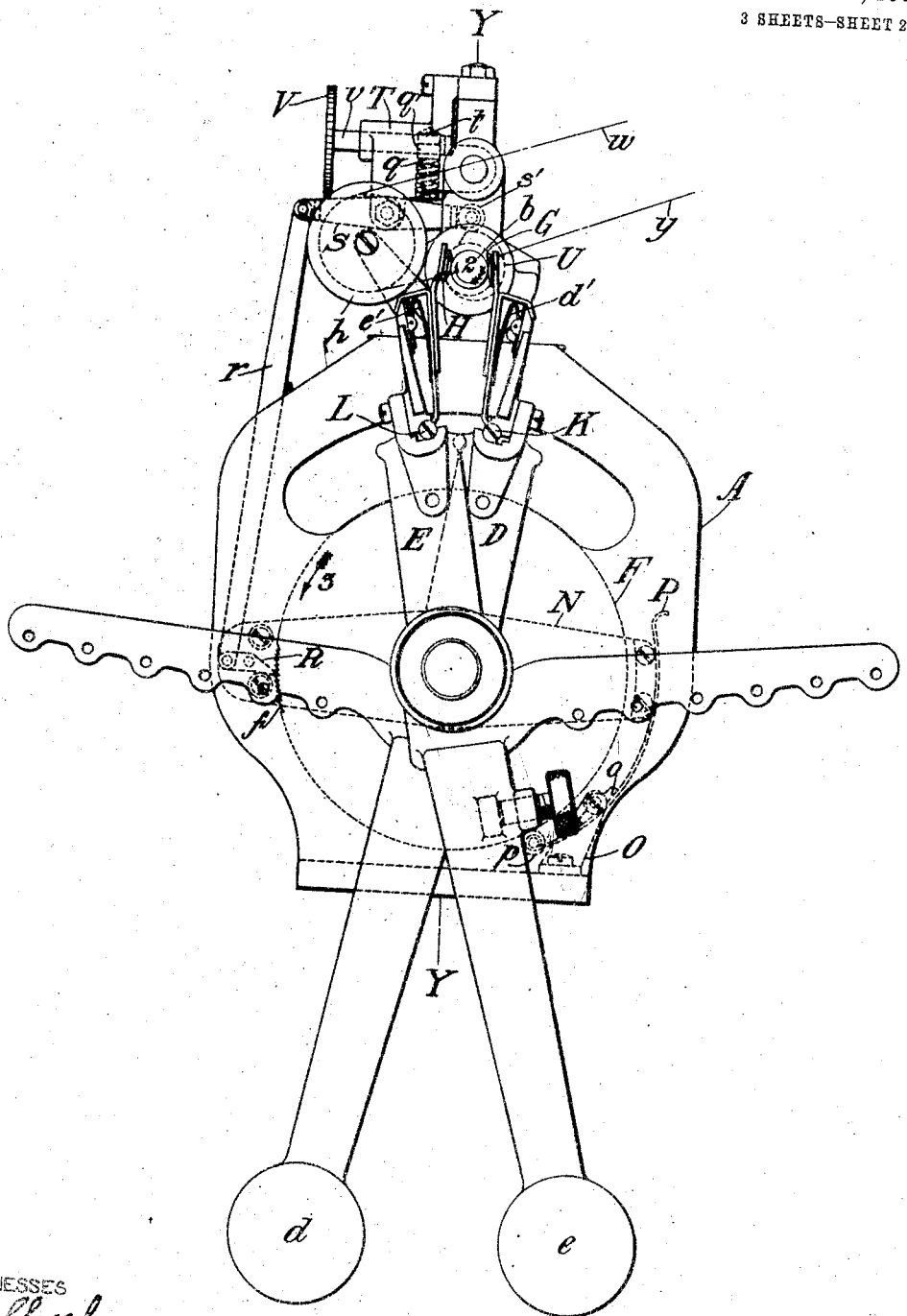
Figure 4:
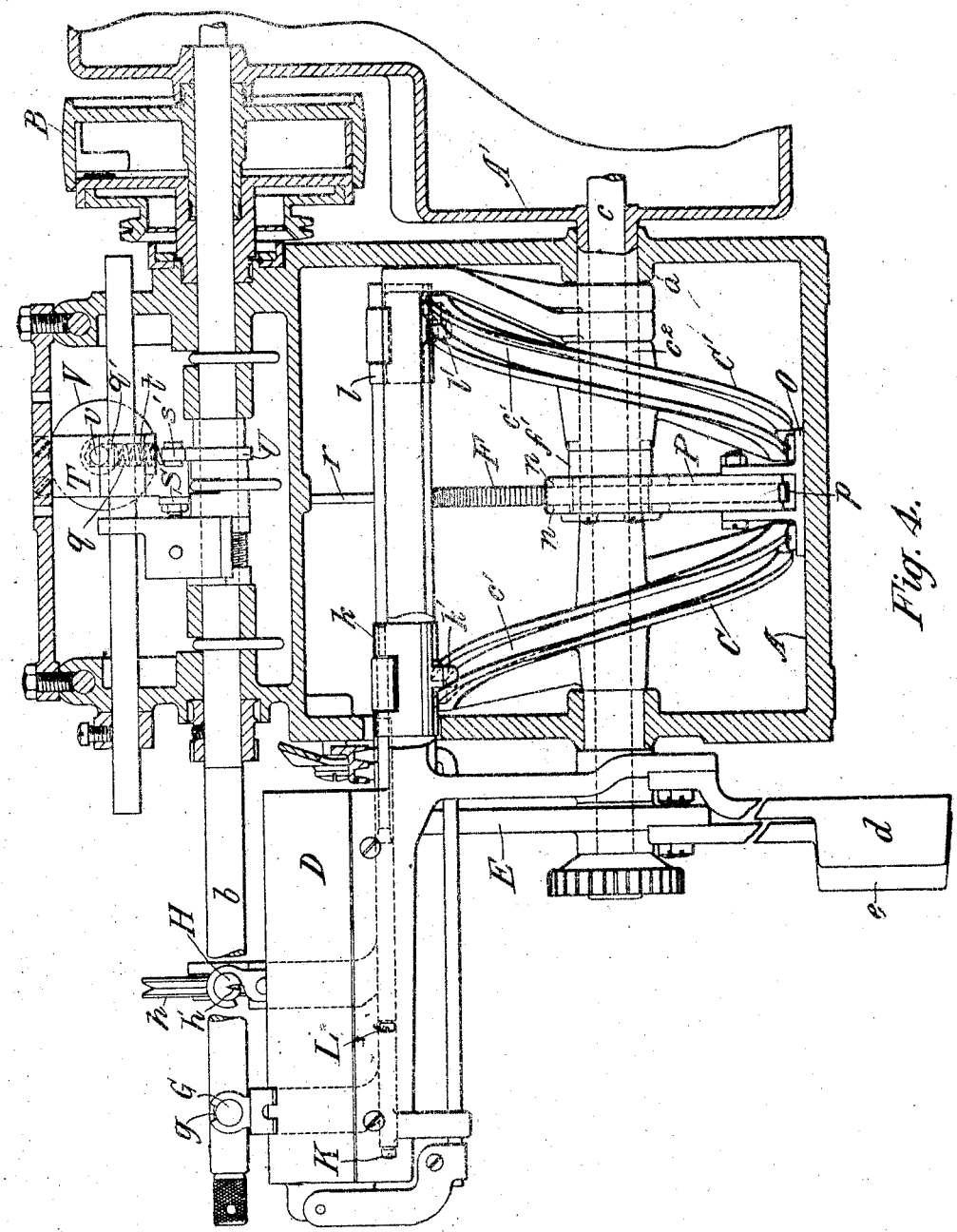

Figure 1 is an enlarged side view of my improved electrical coil with the outer layer of wire windings shown as not quite completed; Fig. 2, a transverse sectional view of the coil taken on the line X—X of Fig. 1; Fig. 3, an end view of the machine employed for winding the coil showing the double guide arrangement; Fig. 4, a side view of the same with the frame of the machine shown in section, taken on the line Y—Y of Fig. 3.

Referring first to Figs. 1 and 2, M designates a magnet or resistance coil made up of alternate layers of wire windings $w$ and yarn windings $y$. The coil is preferably wound on a tube $x$ of paper, fiber or other suitable material which can be removed if desired after the coil is completed. The wire for the coil is usually of the insulated variety having a covering of strands of yarn or thread wound or braided around it, or it might be insulated by the process of enameling or otherwise coating its exterior.

The strands $y$ of binding and insulating material may be of ordinary cotton yarn or other textile thread, or, if desired, narrow tape might be substituted therefor. In the drawings I have shown a single strand of yarn $y$ wound in among the coils of wire $w$, but for some purposes it has been found advantageous to wind the yarn in multiple, that is, using several strands which virtually form a flat tape. The coil M is built up with flat ends and the layers of wire and insulating material alternate as illustrated in Fig. 2. It is to be noted, however, that the strands $y$ weave in and out among the wire windings $w$, that is to say, they lie over and under the wire at regular intervals and in this way the tying together and binding or reinforcement of the coils is effected.

The method of winding the coil will be more fully understood from the following description of the arrangement and operation of the machine employed for producing it, and therefore reference is now made to Figs. 3 and 4 which show the preferred embodiment of the winding mechanism.

Supported in bearings in the main frame A of the machine is a winding-spindle $b$ arranged to be rotated from any source of power through the medium of a driving pulley B. The spindle $b$ is connected to drive a parallel shaft $c$ which carries the cams C and C' for imparting reciprocation to the thread-guide G and wire-guide H. Any suitable means for connecting the spindle and cam-shaft rotatively, such as pulleys and belts or a train or gearing, may be employed, but this part of the mechanism is not here shown or described as it is of well known construction.

Referring to Fig. 3, the thread-guide G and wire-guide H are supported on swinging traverse-frames D and E which are pivoted on the cam-shaft c and carry depending counterweighted arms d and e. The guides G and H are arranged on opposite sides of the winding-spindle b and are adapted to move outward therefrom on their respective traverse-frames as the layers of winding are built up to form the coil. The wire-guide H preferably carries a wheel or pulley h over which the wire runs as it leads to the guide-notch h', while the yarn y leads directly to the notch g in the guide G. The spindle b rotates in the direction indicated by the arrow 2, see Fig. 3, and the guide H is inverted so that the wire w leads through its under side while the yarn y delivers from the top of the guide G. Both guides are maintained constantly in contact with the winding through the agency of their counterweighted traverse-frames so that the coils of yarn and wire are laid very precisely and accurately to insure their proper relation. To provide a sensitive, yielding pressure of the guides against the coil it is preferable to employ springs d' and e' arranged between them and the backs of the frames D and E, so that the guides can move freely to a slight extent in passing over the windings as they traverse along the face of the coil M.

The guides G and H are carried at the ends of traverse-rods K and L which slide in the frames D and E. The rods K and L are attached to runners k and l at their opposite ends and the runners carry studs or rolls k' and l' which engage with grooves c', c' in the cams C, C'. The cam C which reciprocates the thread-guide is fast on the shaft c and is rotated positively therewith, the ratio of speed between it and the winding-spindle being regulated by suitable adjusting devices, not here shown, but well known in connection with their use on winding machines. The cam C' which reciprocates wire-guide is free rotatively of the shaft c and is driven at a much slower speed than the cam C through a separate connection with the winding-spindle as now described:

The cam C' is preferably mounted on a sleeve or bushing c² which extends through the side bearing a of the frame A and forms part of the gear-casing A'. At the center of the cam-shaft c is a ratchet-wheel F, having peripheral teeth f, also mounted on the bushing c² and formed with a hub f' which is splined into the end of the hub of the cam C' or otherwise secured rotatively therewith. A rocker-arm N, see Fig. 3, constructed in two halves n, n, as shown more plainly in Fig. 4, straddles the ratchet-wheel F and is mounted on the hub of said wheel to move independently thereof. Secured to the base of the frame A is a standard or bracket O in which is pivoted a rockable member o carrying an arcuate spring-plate P arranged substantially concentric with the axis of the cam-shaft c. The upper end of the plate P bears against the end of the rocker-arm N to apply friction thereto and prevent a too free movement thereof. The lower end of the plate carries a roll p which bears against the teeth of the ratchet-wheel F to restrain the latter from unwarranted movement. Pivoted on the opposite end of the rocker-arm N is a pawl R formed with its inner end adapted to engage the teeth of the ratchet-wheel F and connected at its outer end to a rod or link r. The upper end of the link r is connected to the end of a rockable lever S pivoted at s on a bracket T secured to the top of the frame A. The inner end of the lever S carries a roll s' which bears on the periphery of the cam U secured on the winding-spindle b to be rotated therewith. A disk V, preferably formed with a knurled periphery, is secured to the end of a stud v which is rotatably mounted in a bearing in the bracket T. A coiled spring q arranged in a pocket t of the bracket T bears at its upper end against a shoe q' which presses against the stud v to provide resistance to the turning of the disk V. The lower end of the spring q bears on the inner end of the lever S and serves to maintain the roll s' in contact with the cam U. The disk V is positioned above the outer end of the lever S with its edge adapted to contact therewith, and is arranged on the stud v eccentric to the axis of the latter. It will thus be seen that by turning the disk the relation of its lower edge to the top of the lever S can be altered, and in this way the movement of the lever under action of the spring q is adjusted to vary the extent of motion imparted to it by the cam U.

The method of winding the coils on the machine is as follows: The yarn y or other insulating material is led from its source of supply through the notch g in the thread-guide G and its end secured to the winding-spindle or tube on which the coil is to be wound. The wire w is led over the guide-wheel h and through the notch h' in the guide H and also secured to the spindle, a free end being generally left for electrical connections, and the machine is then ready to start after the guides have both been placed close to the spindle or tube. As the spindle b rotates to wind up the wire and yarn the cam U will impart a rocking motion to the lever S which is transmitted to the arm N through the link r. Each time the arm N is rocked downward the pawl R is carried into engagement with the teeth f on the ratchet-wheel F and a slight rotative impulse is imparted to the wheel and its connected cam C'. As the outer end of the lever S is rocked upward, under the influence of the spring q, the end of the pawl is slid back over the teeth f and, as before explained, the friction roll p carried by the spring-plate P acts to hold the ratchet-wheel F and cam C' from backward rotation. The cam C' is thus slowly turned in the direction indicated by the arrow 3, Fig. 3, and the wire-guide H is traversed from one end of the coil to the other. By adjusting the disk V, as before explained, the extent of movement of the lever S an be varied to regulate the ratio of speed between the spindle b and the cam C', and in this way the speed of traverse of the guide H is controlled to lay the wire w in closely adjacent coils as illustrated in Fig. 1. It will be understood that the range of adjustment of this part of the mechanism is such that the finest or coarsest wire used for such purposes can be wound with the desired close juxtaposition of the coils. Meanwhile, during the winding of the wire coils, the thread-guide G is being reciprocated rapidly back and forth by the cam C which is driven at a much faster rate of speed than that of the cam C' through its separate connection with the spindle b. This lays the yarn y or other binding and insulating material in cross-coils which intermingle with the wire windings and at the same time build up insulating and cushioning layers between the wire layers as illustrated in Fig. 2. I have found it of advantage to employ a cam C for the yarn or thread-guide G which will give a slightly longer traverse to the latter than the traverse imparted to the guide H by the cam C'. This provides that the layers of insulating material will extend beyond the wire layers a slight distance at either end so as to form a more substantial foundation for the end coils of wire, although this is not essential.

The improved coil produced by the above described system of winding has various mechanical and electrical advantages as now explained: In the first place, the coils may be built up with flat ends and wound to a considerable diameter without the use of spool heads or end flanges. The winding may be accomplished at a much more rapid rate than heretofore and the wire laid with greater precision and accuracy owing to the effect of the coils of insulating material which link and bind the coils of wire together and provide cushioning or reinforcing layers between the layers of wire. Furthermore, my new method of winding the coils provides more complete insulation which removes the danger of short-circuiting and increases the electrical efficiency of the coil. Another important feature is that coils wound by this system are more stable and permanent because the wire windings are less liable to become displaced. That is to say, the linking and binding together of the wire coils by the strands of insulating material provides a reinforced structure which is more capable of resisting the displacement of the wire windings from the effect of expansion and contraction due to changes in temperature. For this reason my new coil is applicable to more diversified uses than coils manufactured by the ordinary process and it can be made practically weatherproof by coating it with shellac or any other suitable waterproof covering.

Various modifications might be made in the system of winding herein disclosed without departing from the spirit or scope of the present invention. For instance, flat wire might be used in place of the round wire here shown and materials other than those above described might be employed for the binding and insulating windings. Different speed ratios between the wire-guide and thread-guide might be arranged as desired, and a greater or less number of windings employed. In place of one guide for the yarn, several could be arranged to be operated simultaneously at different points about the circumference of the coil and other means might be used for reciprocating the guides.

Without limiting myself to the exact embodiment of the invention herein disclosed, what I claim is:—

1. A coil for electrical purposes comprising layers of helically-wound conducting-material, and windings of insulating-material intermingling therewith, with the strands of insulating-material interwoven over and under the separate turns of conducting-material in the layers to bind the latter in place and reinforce the structure.

2. A coil for electrical purposes consisting of layers of helical wire windings, and windings of insulating-material would diagonally or crosswise thereof and interwoven over and under separate turns of wire in the layers to bind the latter in place and reinforce the structure.

3. A coil for electrical purposes consisting of layers of helical wire windings and intermingling cross-windings of yarn or thread, with the yarn windings interwoven over and under the separate turns of wire in the layers to bind the latter in place and reinforce the structure.

4. An improved method of manufacturing electrical coils consisting in winding conducting-material in layers of helical turns and simultaneously winding insulating-material diagonally or crosswise thereof, with the windings of insulating-material passing over two or more turns and under the remaining turns in each layer of conducting-material to bind the latter in place and reinforce the structure.

5. An improved method of manufacturing electrical coils consisting in depositing wire on a core in layers of helical windings and simultaneously depositing yarn or thread in cross-windings intermingling with the wire windings and passing through the layers of wire to bind the latter in place.

6. An improved method of manufacturing electrical coils consisting in depositing wire on a core in layers of helical windings and simultaneously depositing yarn or thread in cross-windings intermingling with the wire windings and overlapping the ends of the wire layers, the separate strands of yarn interweaving over and under the turns of wire in the layers to bind the latter in place and reinforce the coil throughout its length and to protect the ends thereof.

In witness whereof I have hereunto set my hand this 23d day of December, 1912, in presence of two subscribing witnesses.

MAX HELM.

Witnesses:
   LUCIEN MEMMINGER,
   LOUIS RINUY.